United States Patent
Kuroda et al.

(10) Patent No.: US 9,745,057 B2
(45) Date of Patent: *Aug. 29, 2017

(54) ORNITHOPTER

(71) Applicant: MITSUBISHI HEAVY INDUSTRIES, LTD., Tokyo (JP)

(72) Inventors: Satoshi Kuroda, Tokyo (JP); Tomoyuki Mori, Tokyo (JP); Kazuya Hattori, Tokyo (JP); Masato Tahara, Tokyo (JP); Oki Takayama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 14/759,309

(22) PCT Filed: Feb. 19, 2014

(86) PCT No.: PCT/JP2014/053927
§ 371 (c)(1),
(2) Date: Jul. 6, 2015

(87) PCT Pub. No.: WO2014/129503
PCT Pub. Date: Aug. 28, 2014

(65) Prior Publication Data
US 2015/0353193 A1 Dec. 10, 2015

(30) Foreign Application Priority Data
Feb. 21, 2013 (JP) ................... 2013-032535

(51) Int. Cl.
*B64C 33/02* (2006.01)
*A63H 27/00* (2006.01)
*B64C 3/18* (2006.01)

(52) U.S. Cl.
CPC ........... *B64C 33/02* (2013.01); *A63H 27/008* (2013.01); *B64C 3/187* (2013.01); *B64C 2201/025* (2013.01)

(58) Field of Classification Search
CPC ....... B64C 33/00; B64C 33/02; B64C 33/025; B64C 2201/025; A63H 27/008
See application file for complete search history.

(56) References Cited

U.S. PATENT DOCUMENTS 1,428,559 A * 9/1922 Rilleau .................. B64C 33/02
244/123.1
1,450,480 A 4/1923 Buck
(Continued)

FOREIGN PATENT DOCUMENTS

| CH | 111918 | 2/1926 |
|---|---|---|
| CH | 348326 | 8/1960 |

(Continued)

OTHER PUBLICATIONS

Festo AG & Co. KG. (2011). Smartbird [Brochure]. Retrieved from https://www.festo.com/net/SupportPortal/Files/46270/Festo_SmartBird_en.pdf.*

(Continued)

*Primary Examiner* — Joseph W Sanderson
(74) *Attorney, Agent, or Firm* — Wenderoth, Lind & Ponack, L.L.P.

(57) ABSTRACT

An ornithopter includes a main wing mounted on a fuselage. The main wing includes a main spar extending outwardly from the fuselage, and a rib extending rearwardly from the main spar. The rib has an S-shaped camber.

3 Claims, 10 Drawing Sheets

(56) References Cited

U.S. PATENT DOCUMENTS

| | | | |
|---|---|---|---|
| 1,485,163 A | 2/1924 | Braun | |
| 1,679,356 A | 8/1928 | Grunewald | |
| 2,757,886 A | 8/1956 | Correa | |
| 4,417,707 A | 11/1983 | Leong | |
| 4,863,117 A * | 9/1989 | Riout | B64C 33/02 244/219 |
| 5,170,965 A | 12/1992 | Yasuda | |
| 5,288,039 A * | 2/1994 | DeLaurier | B64C 3/52 244/219 |
| 6,250,585 B1 * | 6/2001 | Pell | B64C 33/00 244/22 |
| 6,659,397 B1 * | 12/2003 | Charron | B64C 33/02 244/195 |
| 6,802,473 B2 * | 10/2004 | Charron | B64C 33/02 244/11 |
| 6,840,477 B2 | 1/2005 | Hamamoto et al. | |
| 7,007,889 B2 * | 3/2006 | Charron | B64C 31/02 244/123.9 |
| 7,255,305 B2 * | 8/2007 | Earl | B64C 33/02 244/11 |
| 7,607,610 B1 | 10/2009 | Sterchak | |
| 9,216,823 B2 * | 12/2015 | Matte | B64C 33/02 |
| 2004/0227035 A1 | 11/2004 | Hubbard | B64C 3/14 244/123.1 |
| 2006/0102782 A1 | 5/2006 | Earl et al. | |
| 2007/0158495 A1 * | 7/2007 | Hubbard | B64C 3/14 244/35 R |
| 2012/0248243 A1 | 10/2012 | Greenyer | |
| 2015/0210389 A1 | 7/2015 | Murdock | |
| 2015/0353193 A1 | 12/2015 | Kuroda et al. | |
| 2016/0009389 A1 * | 1/2016 | Kuroda | B64C 33/02 244/11 |

FOREIGN PATENT DOCUMENTS

| | | |
|---|---|---|
| CN | 1118385 C | 8/2003 |
| DE | 568062 | 1/1933 |
| DE | 701 691 | 1/1941 |
| DE | 3537365 | 4/1987 |
| DE | 36 42 640 A1 | 6/1988 |
| DE | 101 37 623 A1 | 2/2003 |
| FR | 2 935 681 | 3/2010 |
| GB | 2 400 089 | 10/2004 |
| JP | 3116172 | 12/2005 |
| JP | 2008-24049 | 2/2008 |
| JP | 2009-90770 | 4/2009 |
| JP | 4675346 | 4/2011 |
| JP | 2011-195050 | 10/2011 |
| JP | 2013-514232 | 4/2013 |

OTHER PUBLICATIONS

Extended European Search Report issued Dec. 23, 2015 in related European Patent Application No. 14754687.3.

Extended European Search Report issued Dec. 14, 2015 in corresponding European Patent Application No. 14754397.9.

International Search Report issued May 27, 2014 in International Application No. PCT/JP2014/053924.

International Search Report issued May 27, 2014 in International Application No. PCT/JP2014/053927.

Festo AG & Co. KG, "Aerodynamic lightweight design with active torsion", [online], Updated date unknown, Dispatch Date of Search report Jan. 6, 2015,Search on Jan. 7, 2015, Internet<http://www.festo.com/net/SupportPortal/Files/46270/Brosch_SmartBird_en_8s_RZ_110311_lo.pdf>.

Erich von Holst et al., "How Ornithopters Fly", [online], Updated date unknown, Dispatch Date of Search report Jan. 6, 2015, Search on Jan. 7, Internet<http://www.ornithopter.de/english/wings.htm>.

International Preliminary Report on Patentability issued Aug. 27, 2015 in corresponding International Application No. PCT/JP2014/053927.

International Preliminary Report on Patentability issued Sep. 3, 2015 in related International Application No. PCT/JP2014/053924.

Office Action issued Oct. 25, 2016 in U.S. Appl. No. 14/759,321.

Decision to Grant a Patent issued Jul. 26, 2016 in corresponding Japanese Application No. 2013-032544 (with English translation).

Notification of Reasons for Refusal issued Feb. 22, 2017 in corresponding Japanese Application No. 2013-032535 (with English translation).

"SmartBird-Festo", Aug. 21, 2012, [online], <URL: http://beamforbid.blogspot.jp/2012/08/smartbird-festo.html#!/2012/08/smartbird-festo.html>.

* cited by examiner

ORNITHOPTER

CROSS-REFERENCE TO RELATED APPLICATIONS

This application claims priority based on Japan Patent Application No. JP 2013-032535 filed on Feb. 21, 2013 and the disclosure thereof is incorporated herein by reference.

TECHNICAL FIELD

The present invention relates to an ornithopter.

BACKGROUND ART

A small unmanned air vehicle (UAV) has been developed. Such a UAV at the present moment is mainly a fixed wing type or a rotary wing type. However, as a future UAV form, development of "flapping type" which imitates birds or insects is initiated. The flapping type UAV has characteristics of both the fixed wing type and the rotary wing type, and is expected from the viewpoint of quietness, low visibility, mimetic characteristics, etc. Such a flapping type UAV is hereinafter referred to as an "ornithopter".

Patent Literature 1 (Japan Patent No. 4,675,346) discloses an example of the ornithopter. This ornithopter includes a main body, and a pair of wings attached to the main body. One of the pair of wings is attached to a left side portion of the main body, and the other of the pair of wings is attached to a right side portion of the main body. Each wing is a single piece wing. The ornithopter floats and travels in the air by a flapping motion and a torsional motion of the pair of the single piece wings.

In the ornithopter disclosed in Patent Literature 1, a torsional motion of a wing is actively controlled by an ultrasonic motor. In the case of adopting the active control, an extra actuator and an extra wiring are required. Therefore, problems such as weight increase and complication of a mechanism occur. Then, the weight increase and the complication of the mechanism cause problems such as increase of thrust loss and drag. In addition, since the way of actively twisting the wing is different from a mechanism in a natural bird, the mimetic characteristics are deteriorated.

CITATION LIST

Patent Literature

Patent Literature 1: Japan Patent No. 4,675,346

SUMMARY OF THE INVENTION

An object of the present invention is to provide an ornithopter having high mimetic characteristics, and which can reduce weight, simplify a mechanism and suppress thrust loss and increase of drag.

In one aspect of the present invention, an ornithopter is provided. The ornithopter includes a main wing mounted on a fuselage. The main wing includes a main spar extending outwardly from the fuselage, and a rib extending rearwardly from the main spar. The rib has an S-shaped camber.

According to the present invention, an ornithopter having high mimetic characteristics and which can reduce weight, simplify a mechanism and suppress thrust loss and increase of drag is realized.

DESCRIPTION OF EMBODIMENTS

Referring to the drawings, an ornithopter according to some embodiments will be explained.

1. CONFIGURATION OF ORNITHOPTER

Figure 1:
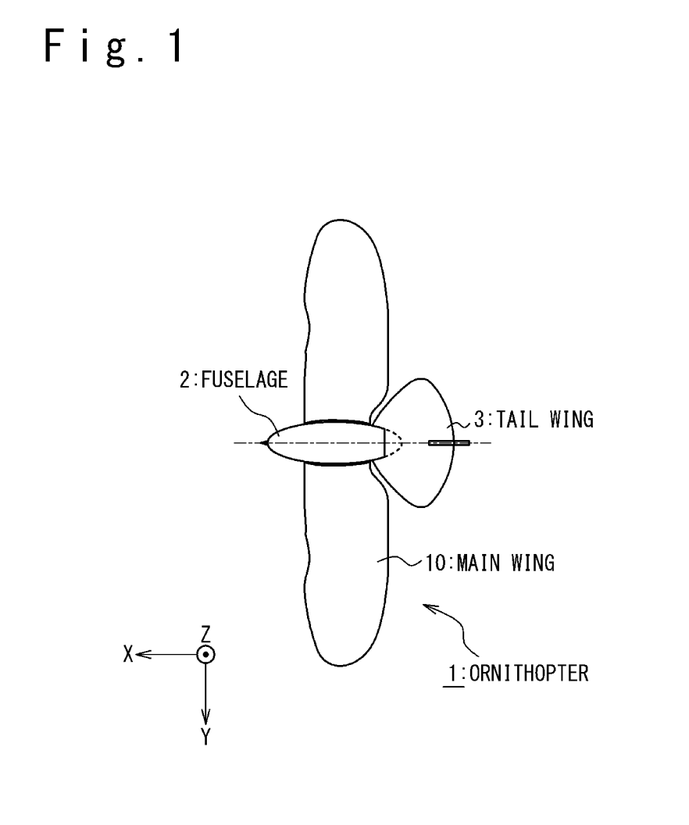
FIG. 1 is a plan view of the ornithopter according to some embodiments.

FIG. 1 is the plan view of the ornithopter 1 according to the present embodiment. Firstly, a coordinate system will be defined. "+X-direction" corresponds to a traveling direction (direction of flight) of the ornithopter 1, and means a forward direction. On the other hand, "−X-direction" means a rearward direction. "Y-direction" corresponds to a sideward direction of the ornithopter 1, and is perpendicular to the X-direction. "Z-direction" is a direction perpendicular to both the X-direction and the Y-direction. "+Z-direction" means an upward direction, and "−Z-direction" means a downward direction. Typically, XY-plane corresponds to a horizontal plane, and +Z-direction corresponds to a vertically upward direction.

As shown in FIG. 1, the ornithopter 1 includes a fuselage 2, a tail wing 3, and a pair of main wings 10. The tail wing 3 is mounted on a rear portion of the fuselage 2. The pair of main wings 10 is mounted on a left side surface of the fuselage 2 and a right side surface of the fuselage 2, respectively. As described later in more detail, a flapping motion of the ornithopter 1 is realized by automatically moving the pair of main wings 10 under control of the control system 100.

Figure 2:
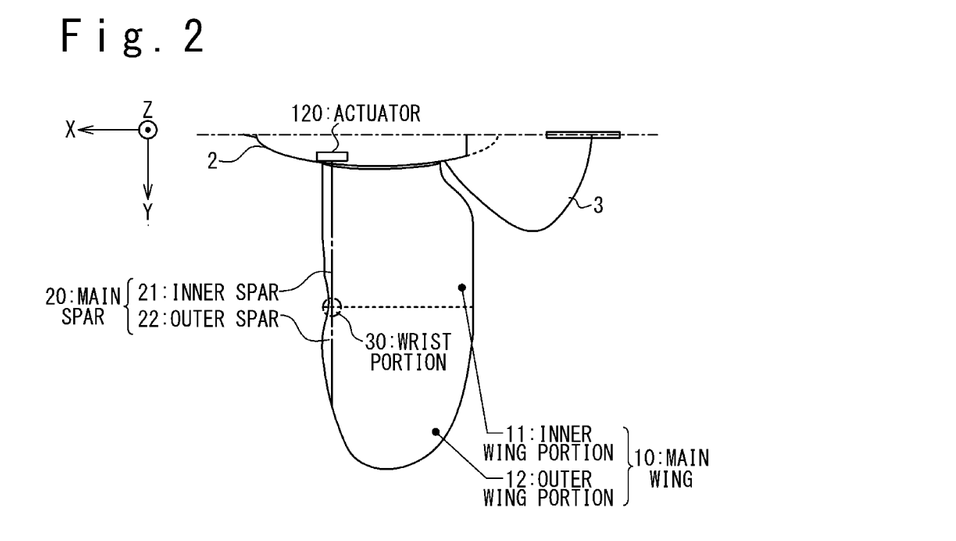
FIG. 2 is a schematic diagram for indicating a configuration of a main wing of the ornithopter according to some embodiments.

FIG. 2 is the schematic diagram for indicating the configuration of the main wing 10 of the ornithopter 1. In this embodiment, the main wing 10 is not a single piece wing, includes a mimicked wrist portion, and is bendable. More specifically, the main wing 10 has an inner wing portion 11 and an outer wing portion 12. The inner wing portion 11 is a portion of an inner side (a side closer to the fuselage 2) of the main wing 10, and is connected to a shoulder portion of the fuselage 2. On the other hand, the outer wing portion 12 is a portion of an outer side (a side farther from the fuselage 2) of the main wing 10, and is connected to an outer end of the inner wing portion 11.

The main wing 10 includes a main spar 20 as a frame. The main spar 20 is disposed to extend outwardly (toward a direction away from the fuselage 2) from the shoulder portion of the fuselage 2. More specifically, the main spar 20 has an inner spar 21 and an outer spar 22. The inner spar 21 is a portion, which is provided in the inner wing portion 11, of the main spar 20, and is disposed to extend outwardly from the shoulder portion of the fuselage 2. On the other hand, the outer spar 22 is a portion, which is provided in the outer wing portion 12, of the main spar 20, and is disposed to extend further outwardly than the inner spar 21.

The main wing 10 further includes a wrist portion 30 disposed between the inner spar 21 and the outer spar 22. That is, the inner spar 21 and the outer spar 22 are connected to each other via the wrist portion 30. The wrist portion 30 is a movable portion, and the main spar 20 is bendable at this wrist portion 30. A configuration example of the wrist portion 30 will be explained later.

A fuselage-side end portion (a root portion) of the inner spar 21 is connected to an actuator 120 provided on the shoulder portion of the fuselage 2. This actuator 120 moves the inner spar 21 in an upward direction or a downward direction in a rotational and reciprocating manner around the shoulder portion of the fuselage 2 as a center of rotation or around a straight line parallel to the X-axis as a rotation axis. Thereby, a "lowering motion" and a "raising motion" of the inner spar 21 (i.e. the main wing 10) are realized.

Figure 3:
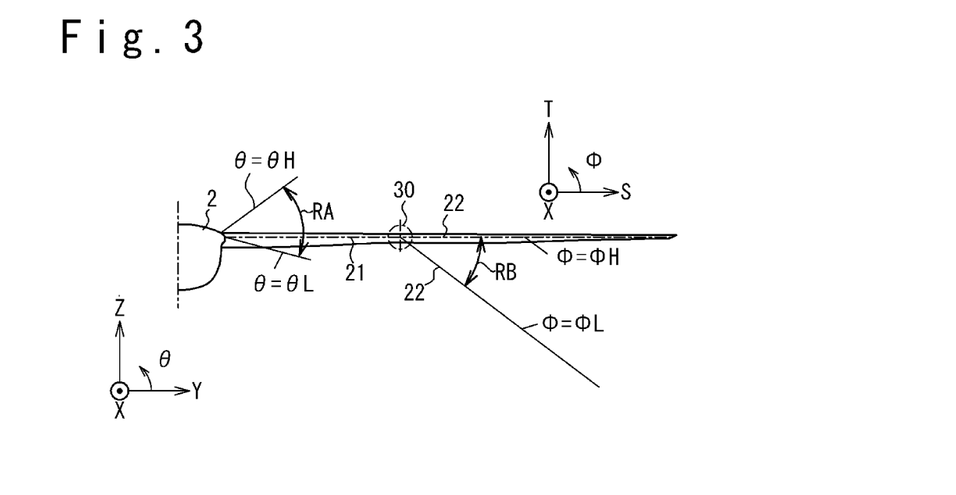
FIG. 3 is a conceptual diagram for indicating a movable range of an inner spar and an outer spar of the ornithopter according to some embodiments.

Next, referring to FIG. 3, a movable range of the inner spar 21 and the outer spar 22 will be explained.

The inner spar 21 rotates around the shoulder portion of the fuselage 2, which is the center of rotation, or around the straight line parallel to the X-axis, which is the rotation axis. Its rotational angle is hereinafter referred to as a "flapping angle $\theta$". As the inner spar 21 rotates in the "+Z-direction" (the upward direction), the flapping angle $\theta$ increases. On the other hand, as the inner spar 21 rotates in the "−Z-direction" (the downward direction), the flapping angle $\theta$ decreases.

A variation range RA of the flapping angle $\theta$ is predetermined, and an upper limit and a lower limit of the predetermined variation range RA are $\theta H$ and $\theta L$, respectively. That is, the flapping angle $\theta$ varies within the predetermined variation range RA defined by the upper limit angle $\theta H$ and the lower limit angle $\theta L$. When the flapping angle $\theta$ is the upper limit angle $\theta H$, the inner spar 21 is located at the top position (+Z-direction side). On the other hand, when the flapping angle $\theta$ is the lower limit angle $\theta L$, the inner spar 21 is located at the bottom position (−Z-direction side).

It is the above mentioned actuator 120 that varies the flapping angle $\theta$ of the inner spar 21. The actuator 120 moves the inner spar 21 in the upward direction or in the downward direction in the rotational and reciprocating manner, and varies the flapping angle $\theta$ within the predetermined variation range RA. A motion of rotating the inner spar 21 in the downward direction, that is, a motion of decreasing the flapping angle $\theta$ toward the lower limit angle $\theta L$ corresponds to the "lowering motion". On the other hand, a motion of rotating the inner spar 21 in the upward direction, that is, a motion of increasing the flapping angle $\theta$ toward the upper limit angle $\theta H$ corresponds to the "raising motion".

The outer spar 22 connected to the inner spar 21 via the wrist portion 30 relatively moves with respect to the inner spar 21. The relative angle between the inner spar 21 and the outer spar 22 is hereinafter referred to as a "bending angle $\phi$".

Here, in order to facilitate the explanation of the bending angle $\phi$, a relative coordinate system in which the inner spar 21 is used as a reference is defined. As shown in FIG. 3, an extending direction of the inner spar 21 corresponds to an S-direction. The S-direction is perpendicular to the X-direction. Also, a T-direction is a direction perpendicular to both the X-direction and the S-direction. +T-direction means an upward direction, and −T-direction means a downward direction.

The outer spar 22 rotates around the wrist portion 30 as a center of rotation, or around a straight line parallel to the X-axis as the rotation axis. Its rotational angle is the above mentioned "bending angle $\phi$". As the outer spar 22 rotates in the +T-direction (the upward direction), the bending angle $\phi$ increases. On the other hand, as the outer spar 22 rotates in the −T-direction (the downward direction), the bending angle $\phi$ decreases.

A variation range RB of the bending angle $\phi$ is predetermined, and an upper limit and a lower limit of the predetermined variation range RB are $\phi H$ and $\phi L$, respectively. That is, the bending angle $\phi$ varies within the predetermined variation range RB defined by the upper limit angle $\phi H$ and the lower limit angle $\phi L$. When the bending angle $\phi$ is the upper limit angle $\phi H$, the outer spar 22 is located at the top position (+T-direction side). Typically, when the bending angle $\phi$ is the upper limit angle $\phi H$, the inner spar 21 and the outer spar 22 are forming a straight line. That is, an extending direction of the outer spar 22 coincides with the S-direction. However, embodiments are not limited to the above mentioned example. On the other hand, when the bending angle $\phi$ is the lower limit angle $\phi L$, the outer spar 22 is located at the bottom position (−T-direction side).

In the present embodiment, unlike the case of the inner spar 21 described above, an actuator is not provided with respect to the outer spar 22. That is, in the wrist portion 30, the actuator for directly and mechanically moving the outer spar 22 is not provided. As will be explained later in detail, the outer spar 22 follows the lowering motion and the raising motion of the inner spar 21, and is moved only in a "passive" manner.

Figure 4A:
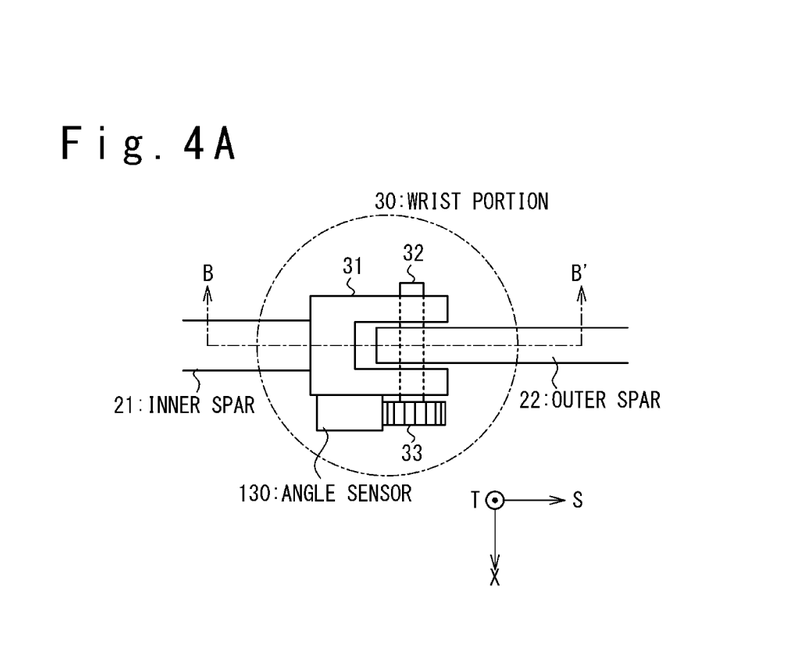
FIG. 4A is a schematic diagram for indicating a configuration of a wrist portion of the ornithopter according to some embodiments.
Figure 4B:
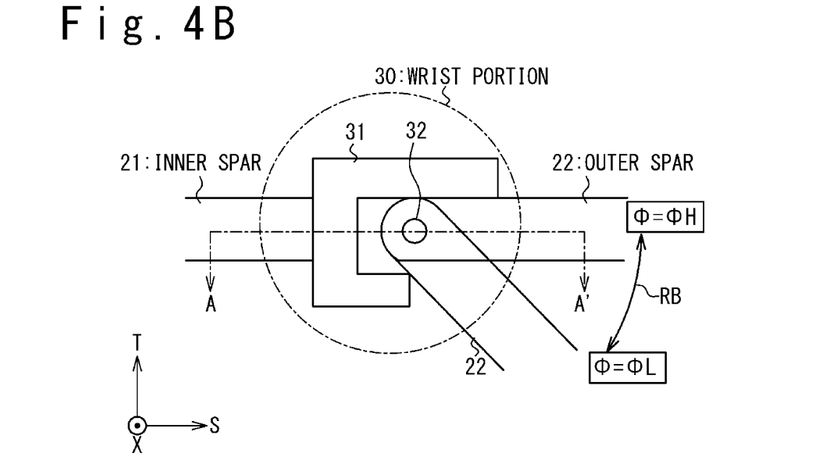
FIG. 4B is a schematic diagram for indicating the configuration of the wrist portion of the ornithopter according to some embodiments.

The wrist portion 30 is configured such that the bending angle $\phi$ of the outer spar 22 varies within the predetermined variable range RB. FIG. 4A and FIG. 4B schematically indicate a configuration example of such a wrist portion 30. FIG. 4A is an SX-cross-sectional view taken along the line A-A' in FIG. 4B, and FIG. 4B is an ST-cross-sectional view taken along the line B-B' in FIG. 4A.

As shown in FIG. 4A and FIG. 4B, in the wrist portion 30, a connector 31 connected to an end portion of the inner spar 21 is provided. Also, on an end portion of the outer spar 22, a shaft 32 which can move integrally with the outer spar 22 is provided. The shaft 32 is fitted in a hole formed in the connector 31. Thereby, the outer spar 22 can rotate around the shaft 32. That is, the bending angle $\phi$ of the outer spar 22 becomes variable. The upper limit angle $\phi H$ and the lower limit angle $\phi L$ of the bending angle $\phi$ can be set appropriately by adjusting a shape of the connector as shown in FIG. 4B. In other words, the variation range RB of the bending angle φ is appropriately set by a mechanical limiter. For example, a position where an upper surface of the outer spar 22 is in contact with a lower surface of an upper portion of the connector 31 corresponds to the upper limit angle φH, and a position where a lower surface of the outer spar 22 is in contact with an end surface of a lower portion of the connector 31 corresponds to the lower limit angle φL.

Further, in the wrist portion 30, an angle sensor 130 for measuring the bending angle φ is provided. In the example shown in FIG. 4A and FIG. 4B, a gear 33 is provided on one end of the shaft 32, and is configured to rotate with the rotation of the outer spar 22. The angle sensor 130 is disposed on the connector 31 so as to be adjacent to the gear 33, and measures the bending angle φ of the outer spar 22 based on the rotation of the gear 33. As explained later in detail, according to the present embodiment, the bending angle φ measured by the angle sensor 130 is used to control a motion of the inner spar 21.

Figure 5:
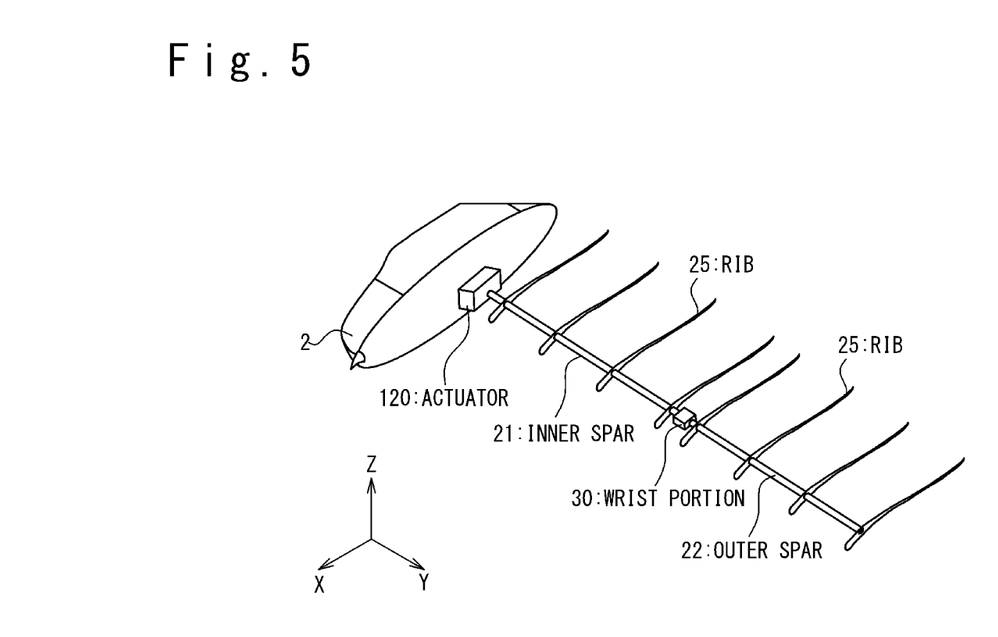
FIG. 5 is a schematic diagram for indicating a configuration of a main spar and ribs of the ornithopter according to some embodiments.

Next, referring to FIGS. 5 to 7B, a rib, which is another frame of the main wing 10, will be explained. As shown in FIG. 5, on the main spar 20, a plurality of the ribs 25 is mounted. Each rib 25 is provided so as to extend rearwardly (−X-direction) from the main spar 20.

Figure 6:
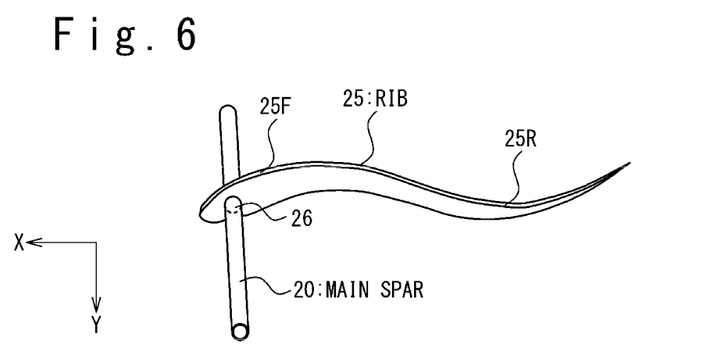
FIG. 6 is a schematic diagram for indicating the configuration of the rib of the ornithopter according to some embodiments.

FIG. 6 indicates a configuration of one rib 25. A front side portion of the rib 25 (+X-direction side) is a rib front portion 25F. On the other hand, a rear side portion of the rib 25 (−X-direction side) is a rib rear portion 25R. As shown in FIG. 6, a hole 26 is formed in the rib front portion 25F, and the main spar 20 passes through the hole 26. That is, the rib 25 is disposed rotatably about the main spar 20.

Figure 7A:
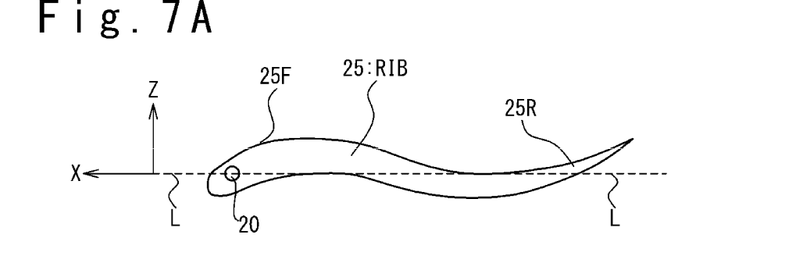
FIGS. 7A and 7B are schematic diagrams for indicating a function of the rib of the ornithopter according to some embodiments.
Figure 7B:
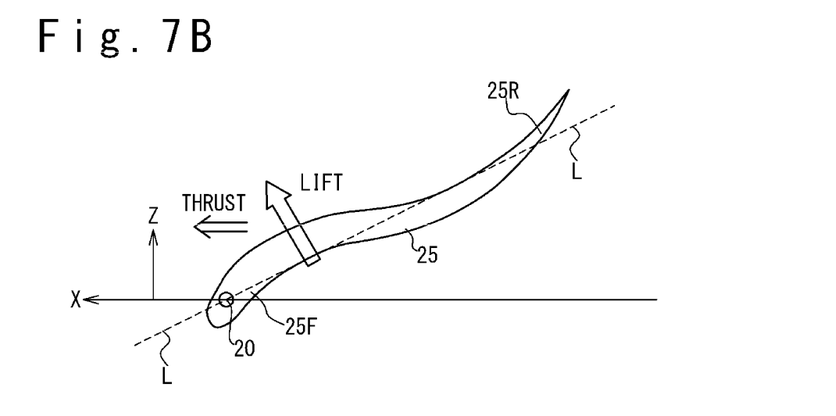

In addition, in the present embodiment, the rib 25 has an S-shaped camber (an inverted camber). The rib rear portion 25R is curved upward. Referring to FIG. 7A and FIG. 7B, a function of this S-shaped camber wing will be explained. During the lowering motion of the main wing 10, the rib 25 having the S-shaped camber is automatically tilted (twisted) from the X-direction as shown in FIG. 7B. This tilt angle (twist amount) is determined based on a flight speed of the ornithopter 1 and a lowering speed of the main wing 10 at the position of the ornithopter 1, and the tilt angle becomes larger as the lowering speed becomes higher. That is, during the lowering motion of the main wing 10, a wing plane L of the main wing (for simplicity, the wing plane is represented linearly) is automatically inclined at some angle from the X-direction. Then, since the wing plane L is inclined from the X-direction, a thrust in the +X-direction (traveling direction) is generated as shown in FIG. 7B. That is, the wing plane L is automatically inclined such that the wing plane L becomes stable against the wind vane direction, and consequently the thrust is generated.

Note that, in the present embodiment, an actuator is not provided for the rib 25. In other words, an actuator for directly and mechanically moving the rib 25 is not provided. As described above, the rib 25 has the S-shaped camber, and is automatically tilted (twisted) from the X-direction during the lowering motion of the main wing 10.

2. CONTROL SYSTEM

Figure 8:
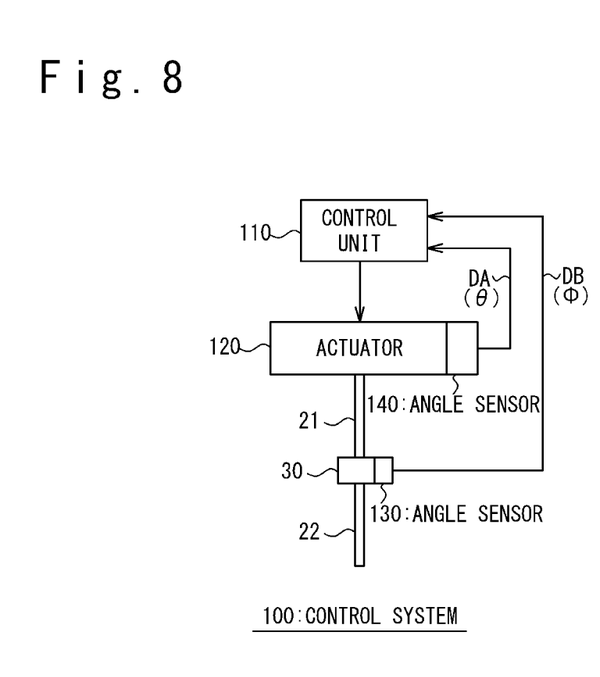
FIG. 8 is a block diagram for indicating a function and a configuration of a control system of the ornithopter according to some embodiments.

The ornithopter 1 according to the present embodiment has a control system 100 for controlling a flapping motion of the main wing 10. FIG. 8 is the block diagram for indicating a function and a configuration of the control system 100. The control system 100 includes a control unit 110, the actuator 120, the angle sensor 130, and an angle sensor 140.

As described above, the actuator 120 is a mechanical mechanism for moving the inner spar 21. The actuator 120 rotates the inner spar 21 in the upward direction or the downward direction, and thereby the raising motion or the lowering motion is realized.

As described above, the angle sensor 130 is provided in the wrist portion 30, and measures the bending angle φ of the outer spar 22. Then, the angle sensor 130 transmits bending angle data DB indicating the measured bending angle φ to the control unit 110 in a real-time manner.

The angle sensor 140 is provided with the actuator 120, and measures the flapping angle θ of the inner spar 21. Then, the angle sensor 140 transmits flapping angle data DA indicating the measured flapping angle θ to the control unit 110 in a real-time manner. Note that the angle sensor 140 is not necessarily required.

The control unit 110 is a computer that is mounted inside the fuselage 2. The control unit 110 controls the raising motion and the lowering motion of the inner spar 21 by controlling the actuator 120. More specifically, the control unit 110 receives the flapping angle data DA and the bending angle data DB, and monitors the flapping angle θ and the bending angle φ in a real-time manner. Then, the control unit 110 controls the actuator 120 and moves the inner spar 21 in response to at least the bending angle φ. A controlled object by the control unit 110 is, for example, a timing of the raising motion and the lowering motion.

3. EXAMPLE OF CONTROL

Figure 9:
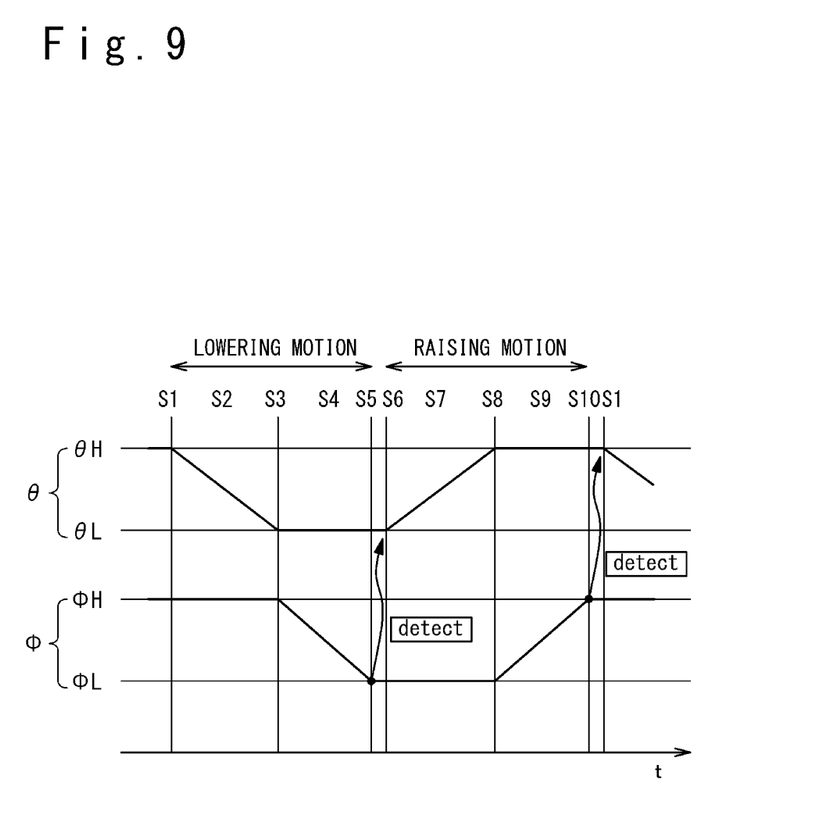
FIG. 9 is a timing chart for indicating a lowering motion and a raising motion of the main wing of the ornithopter according to some embodiments.

Next, an example of control for the lowering motion and the raising motion will be explained. FIG. 9 is the timing chart for indicating the example of the control. In FIG. 9, transition of the flapping angle θ of the inner spar 21 and transition of the bending angle φ of the outer spar 22, respectively are indicated. In addition, states S1 to S5 correspond to the lowering motion, and states S6 to S10 correspond to the raising motion. In the following, the lowering motion (states S1 to S5) and the raising motion (states S6 to S10), respectively will be explained in detail.

3-1. Lowering Motion

Figure 10:
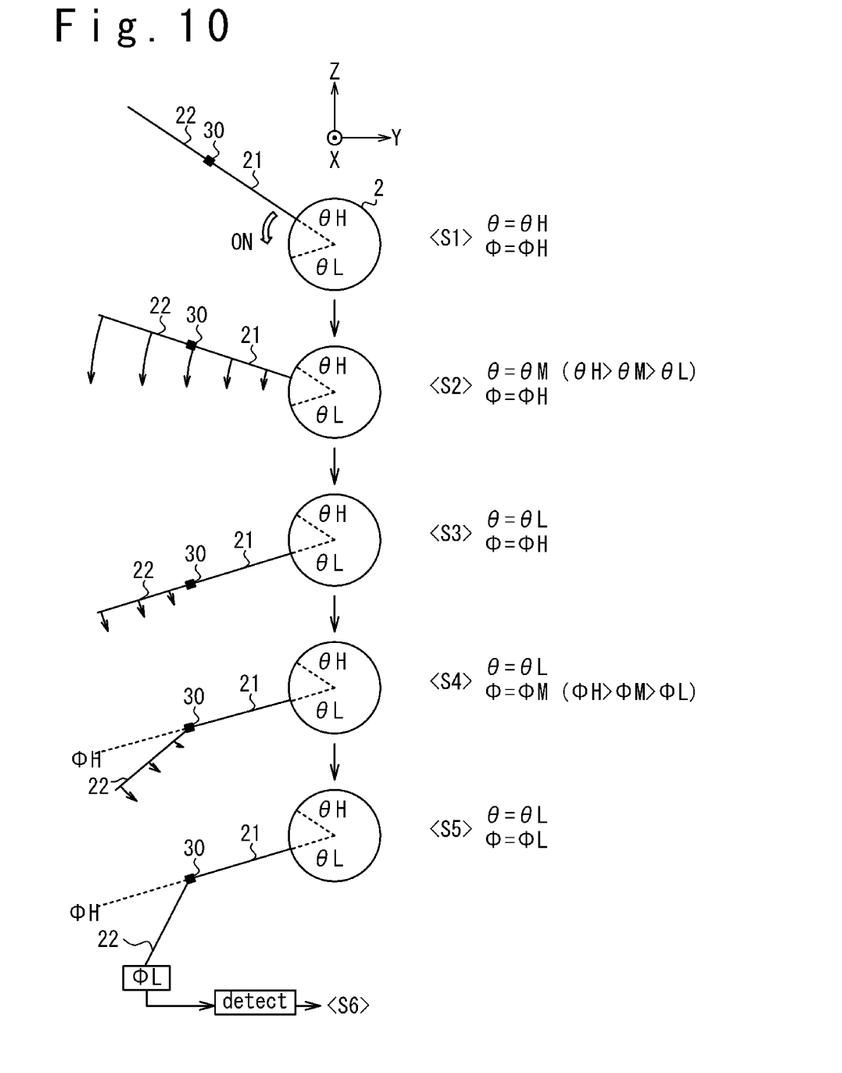
FIG. 10 is a conceptual diagram for explaining the lowering motion of the main wing of the ornithopter according to some embodiments.

FIG. 10 is the conceptual diagram for explaining the lowering motion. Referring to FIG. 9 and FIG. 10, the lowering motion will be explained.
<State S1>

The state S1 is a state in which both the inner spar 21 and the outer spar 22 are at the top position. In this moment, the flapping angle θ is the upper limit angle θH, and the bending angle φ is the upper limit angle φH. In this state S1, the lowering motion is started. Specifically, the control unit 110 controls the actuator 120 to initiate the lowering motion of the inner spar 21.
<State S2>

The state S2 is a state in which the inner spar 21 is being lowered by the actuator 120. In this moment, the flapping angle θ is an intermediate angle θM (θH>θM>θL). The outer spar 22 is passively moved in the downward direction by following the lowering motion of the inner spar 21, while the bending angle φ is remained in the upper limit angle φH.

Further, as explained with reference to FIG. 7B, the rib 25 having the S-shaped camber is automatically tilted (twisted) from the X-direction. That is, the wing plane L of the wing 10 is automatically inclined at some angle from the X-direction. Thereby, the thrust in the +X-direction (traveling direction) is generated. Note that the tilt angle (twist amount) is determined based on the flight speed of the ornithopter 1 and the lowering speed of the main wing 10 at the position of the ornithopter 1, and the tilt angle becomes larger as the lowering speed becomes higher. Therefore, the tilt angle as well as the resultant thrust is progressively increasing toward the wing tip (as farther from the fuselage 2).

<State S3>

The state S3 is a state in which the inner spar 21 is at the bottom position. In this moment, the flapping angle $\theta$ is the lower limit angle L. The motion of the inner spar 21 is stopped in this moment, while the outer spar 22, which was following the inner spar 21, continues to move by the inertia. That is, the outer spar 22 naturally moves by the momentum of the lowering motion of the inner spar 21 even if the actuator is not provided with the outer spar.

<State S4>

The state S4 is a state in which only the outer spar 22 moves, while the inner spar 21 is at the bottom position. In this moment, the bending angle $\phi$ is an intermediate angle $\phi M$ ($\phi H > \phi M > \phi L$). Note that, in this moment, the actuator 120 fixes the inner spar 21, and keeps the flapping angle $\theta$ at the lower limit angle $\theta L$.

<State S5>

The state S5 is a state in which both the inner spar 21 and the outer spar 22 are at the bottom position. In this moment, the flapping angle $\theta$ is the lower limit angle $\theta L$, and the bending angle $\phi$ is the lower limit angle $\phi L$. When the control unit 110, which monitors the flapping angle $\theta$ and the bending angle $\phi$ in the real-time manner using the angle sensors 130 and 140, detects this state S5, subsequent raising control (see state S6) is initiated. That is, when the state in which the bending angle $\phi$ becomes the lower limit angle $\theta L$ is detected after the lowering motion of the inner spar 21, the control unit 110 controls the actuator 120 to initiate the raising motion of the inner spar 21.

3-2. Raising Motion

Figure 11:
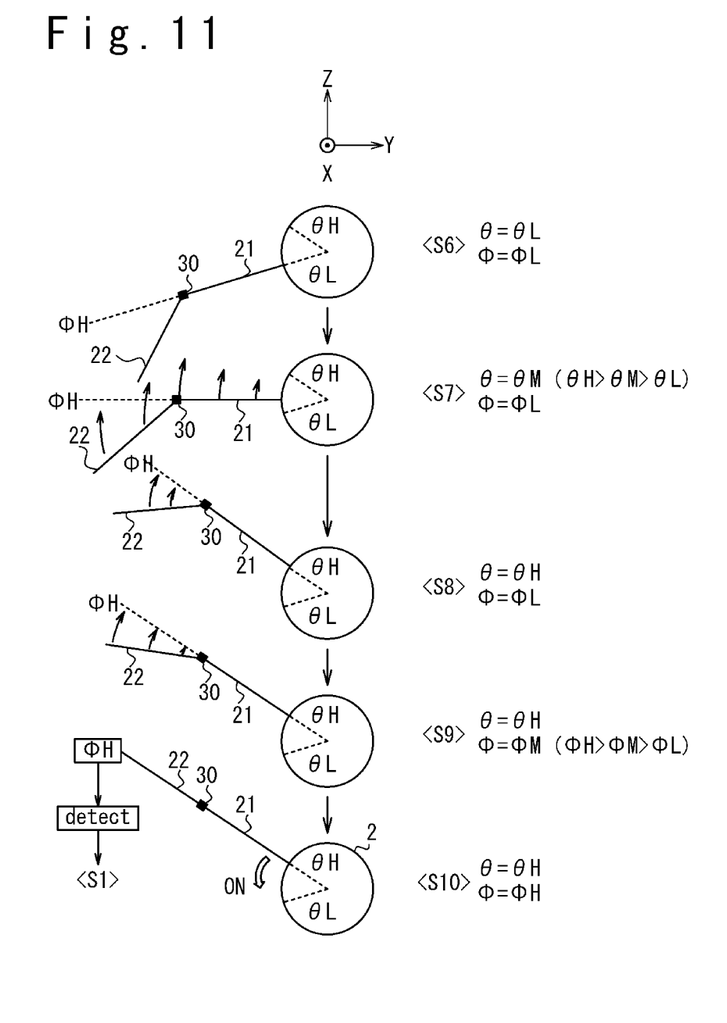
FIG. 11 is a conceptual diagram for explaining the raising motion of the main wing of the ornithopter according to some embodiments.

FIG. 11 is the conceptual diagram for explaining the raising motion. Referring to FIG. 9 and FIG. 11, the raising motion will be explained.

<State S6>

The state S6 is the same as the above mentioned state S5. In this state S6, the fixation of the inner spar 21 is released, and the raising motion is initiated. Specifically, the control unit 110 controls the actuator 120 to start the raising motion of the inner spar 21.

<State S7>

The state S7 is a state in which the inner spar 21 is being raised by the actuator 120. In this moment, the flapping angle $\theta$ is an intermediate angle $\theta M$ ($\theta H > \theta M > \theta L$). The outer spar 22 is passively moved in the upward direction by following the raising motion of the inner spar 21, while the bending angle $\phi$ is remained in the lower limit angle $\phi L$.

<State S8>

The state S8 is a state in which the inner spar 21 is at the top position. In this moment, the flapping angle $\theta$ is the upper limit angle H. The motion of the inner spar 21 is stopped in this moment, while the outer spar 22, which was following the inner spar 21, continues to move by the inertia. That is, the outer spar 22 naturally moves by the momentum of the raising motion of the inner spar 21 even if the actuator is not provided with the outer spar.

<State S9>

The state S9 is a state in which only the outer spar 22 moves, while the inner spar 21 is at the top position. In this moment, the bending angle $\phi$ is an intermediate angle $\phi M$ ($\phi H > \phi M > \phi L$). Note that, in this moment, the actuator 120 fixes the inner spar 21, and keeps the flapping angle $\theta$ at the upper limit angle $\theta H$.

<State S10>

The state S10 is a state in which both the inner spar 21 and the outer spar 22 are at the top position. In this moment, the flapping angle $\theta$ is the upper limit angle $\theta H$, and the bending angle $\phi$ is the upper limit angle $\phi H$. When the control unit 110, which monitors the flapping angle $\theta$ and the bending angle $\phi$ in the real-time manner using the angle sensors 130 and 140, detects this state S10, above mentioned lowering control (see state S1) is initiated. That is, when the state in which the bending angle $\phi$ becomes the upper limit angle $\phi H$ is detected after the raising motion of the inner spar 21, the control unit 110 controls the actuator 120 to initiate the lowering motion of the inner spar 21.

Note that in the raising motion, there exists a possibility that the main wing 10 is automatically raised by aerodynamic force. In such a case, it is not necessary to actively move the inner spar 21 using the actuator 120. In this case, in the state S6, the control unit 110 controls the actuator 120 to only release the fixation of the inner spar 21.

By repeating the lowering motion and the raising motion described above, the flapping motion of the ornithopter 1 according to the present embodiment is realized.

4. EFFECT

According to the present embodiment, the main wing 10 of ornithopter 1 includes the mimicked wrist portion 30 configured to be bendable. Therefore, mimetic characteristics are improved and the thrust loss and the increase of the drag are suppressed as compared to the case in which the single piece wing is used.

Furthermore, according to the present embodiment, the following effects can be obtained. To illustrate the effects, firstly, following comparative example will be considered.

In the comparative example, in the wrist portion 30, an actuator (motor, link mechanism etc.) for directly and mechanically moving the outer spar 22 is provided. Then, in addition to the inner spar 21, the outer spar 22 is forcibly moved using the actuator. Furthermore, an actuator is also provided for the rib 25, and by forcibly inclining the rib 25, the wing plane L is tilted from the X-direction. Motion states (motion timing, motion frequency, motion speed) of the inner spar 21, the outer spar 22 and the rib 25 using the actuators are appropriately set, respectively.

In the case of such a comparative example, the following problems exist. Firstly, since extra actuators and wiring are necessary, weight will be increased and constitution will be complicated. Moreover, since the way of forcibly moving the outer spar 22 or the rib 25 is different from a mechanism in a natural bird, the mimetic characteristics are deteriorated.

In addition, in case that the lowering motion is initiated before the outer spar 22 reaches the top position (before the bending angle $\phi$ becomes the upper limit angle $\phi H$) or the raising motion is initiated before the outer spar 22 reaches the bottom position (before the bending angle $\phi$ becomes the lower limit angle $\phi L$), problems such as thrust loss, drag increase and deterioration of mimetic characteristics occur.

In order to prevent such problems, motions of the inner spar 21, the outer spar 22 and the rib 25, respectively should be appropriately controlled. However, appropriate motion states (motion timing, motion frequency, motion speed) vary greatly depending on the environment such as flight speed etc. Therefore, it is necessary that the motion states of the inner spar 21, the outer spar 22 and the rib 25, respectively are controlled dynamically in response to the variation of the environment such as flight speed. However, such a dynamical control is very difficult. That is, the comparative example has poor adaptability to the environment.

On the contrary to such a comparative example, in the present embodiment, the actuator for directly and mechanically moving the outer spar 22 is not provided in the wrist portion 30. The outer spar 22 only passively moves by following the lowering motion and the raising motion of the inner spar 21. As explained with reference to FIG. 10 and FIG. 11, the outer spar 22, which follows the inner spar 21, naturally moves by the momentum of the raising motion or the lowering motion of the inner spar 21 without the actuator.

Further, the actuator is not provided with respect to the rib 25. That is, the actuator for directly and mechanically moving the rib 25 is not provided. As explained with reference to FIG. 6, FIG. 7A, and FIG. 7B, the rib 25 has the S-shaped camber form, and is automatically tilted from the X-direction during the lowering motion of the main wing 10.

Thus, since it is not necessary to provide extra actuators with respect to the outer spar 22 or the rib 25, it is possible to reduce the weight and simplify the mechanism. In addition, since the outer spar 22 or the rib 25 is not forcibly moved, the mimetic characteristics are improved and the thrust loss and the increase of the drag are suppressed.

Furthermore, according to the present embodiment, the angle sensor 130 for measuring the bending angle $\phi$ of the outer spar 22 is provided in the wrist portion 30. Then, the control unit 110 controls the actuator 120 to move the inner spar 21 in response to the measured bending angle $\phi$ by the angle sensor 130. As a result, as shown in FIGS. 9 to 11, it is possible that the lowering motion is initiated after the outer spar 22 reaches the top position (after the bending angle $\phi$ becomes the upper limit angle $\phi$H). Also, it is possible that the raising motion is initiated after the outer spar 22 reaches the bottom position (after the bending angle $\phi$ becomes the lower limit angle W. That is, it is possible to realize the optimum flapping motion from the viewpoint of the thrust, the drag, and the mimetic characteristics. Since the bending angle $\phi$ itself is monitored using the angle sensor 130, the optimum flapping motion is always realized regardless of the environment such as the flight speed. In this sense, the present embodiment can be said to have a high adaptability to the environment.

5. ALTERNATIVE EXAMPLE

5-1. First Alternative Example

Figure 12:
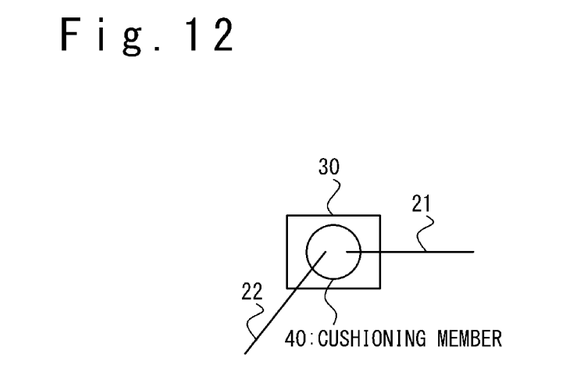
FIG. 12 is a schematic diagram for indicating an alternative example of some embodiments.

As described above, according to the present embodiment, the outer spar 22 passively moves by following the lowering motion and the raising motion of the inner spar 21. However, there exists a possibility that, the motion of the outer spar 22 becomes a jittery motion in case of using the above mentioned configuration itself. Therefore, as shown in FIG. 12, a cushioning member 40 may be provided in the wrist portion 30. The cushioning member 40 serves to mitigate momentum of relative motion of the outer spar 22 with respect to the inner spar 21. For example, the cushioning member 40 is a spring connecting between the outer spar 22 and a support member. With such a cushioning member 40, it is possible to suppress a sudden movement of the outer spar 22. As a result, the mimetic characteristics of the ornithopter 1 are further improved.

5-2. Second Alternative Example

In the example of control explained with reference to FIGS. 9 to 11, the actuator 120 is activated to move the inner spar 21 by using the detection of $\phi=\phi$H or $\phi=\phi$L as a trigger. However, a reference value of the bending angle $\phi$ which is served as the trigger may not necessarily be the upper limit angle $\phi$H or the lower limit angle $\phi$L. The reference value of the bending angle $\phi$ which is served as the trigger may be appropriately set based on a motion mode of the ornithopter 1 or an intended purpose.

As described above, some embodiments of the present invention has been explained with reference to the accompanying drawings. However, the present invention is not limited to the above mentioned embodiments, and may be appropriately modified by the person having ordinary skill in the art without departing from the scope of the invention.

The invention claimed is:

1. An ornithopter comprising:
a main wing mounted on a fuselage,
wherein the main wing comprises:
a main spar extending outwardly from the fuselage; and
a plurality of ribs extending rearwardly from the main spar,
wherein the plurality of ribs include a rib disposed at an end of the main spar,
wherein each of the plurality of ribs has an S-shaped camber, and
wherein each of the plurality of ribs is arranged to be passively automatically tilted based on a flight speed and a lowering speed of the main wing without an actuator which directly and mechanically moves each of the plurality of ribs.

2. The ornithopter according to claim 1, wherein each of the plurality of ribs is rotatable around the main spar.

3. The ornithopter according to claim 1, wherein a hole is formed in a front portion of each of the plurality of ribs, and wherein the main spar is disposed so as to pass through the hole in each of the plurality of ribs.

* * * * *